(12) United States Patent
Heron

(10) Patent No.: US 9,526,378 B2
(45) Date of Patent: Dec. 27, 2016

(54) UNIVERSAL POT COVER HOLDER WITH SPOON REST 2

(71) Applicant: David Wayne Heron, Brooklyn, NY (US)

(72) Inventor: David Wayne Heron, Brooklyn, NY (US)

(*) Notice: Subject to any disclaimer, the term of this patent is extended or adjusted under 35 U.S.C. 154(b) by 0 days.

(21) Appl. No.: 14/555,733

(22) Filed: Dec. 20, 2014

(65) Prior Publication Data

US 2016/0174772 A1    Jun. 23, 2016

(51) Int. Cl.
*A47G 21/14* (2006.01)
*A47J 47/16* (2006.01)

(52) U.S. Cl.
CPC .................... *A47J 47/16* (2013.01)

(58) Field of Classification Search
USPC ............................................ 248/37.6
See application file for complete search history.

(56) References Cited

U.S. PATENT DOCUMENTS

| | | | | |
|---|---|---|---|---|
| 920,747 A * | 5/1909 | Hughes | A47J 43/287 108/47 |
| 2,705,657 A * | 4/1955 | Di Giorgio | A47J 45/10 220/744 |
| 3,215,387 A * | 11/1965 | Thompson | A47B 96/061 108/147.17 |
| 3,487,946 A * | 1/1970 | Sakurai Masao | A47G 21/14 211/70.7 |
| 4,592,471 A * | 6/1986 | Bross | A47J 47/16 108/61 |
| 4,790,503 A * | 12/1988 | Pohler | A47J 47/16 211/41.11 |
| 4,850,556 A * | 7/1989 | Otani et al. | A47J 47/16 248/206.2 |
| 4,893,771 A * | 1/1990 | Kaneshiro | A47J 47/16 211/181.1 |
| 5,127,616 A * | 7/1992 | Carney | A47J 47/16 211/41.11 |
| 5,396,993 A * | 3/1995 | Spitler | A47J 47/16 211/41.2 |
| D408,229 S * | 4/1999 | Hong | D7/601 |
| 5,979,673 A * | 11/1999 | Dooley | A47J 47/16 211/41.11 |
| 6,012,593 A * | 1/2000 | Knittel | A47J 47/16 211/181.1 |
| 6,505,746 B1 * | 1/2003 | Johnson | A47J 47/16 211/70.7 |
| 7,267,308 B1 * | 9/2007 | Jenson | A47J 47/16 211/181.1 |
| 8,479,926 B1 * | 7/2013 | Blaisdell | A47J 47/16 211/181.1 |
| 2002/0158031 A1 * | 10/2002 | Powers | A47J 47/16 211/41.11 |

(Continued)

*Primary Examiner* — Monica Millner

(57) ABSTRACT

A universal pot cover holder with spoon rest 2 is an apparatus capable of placing hot dripping pot covers without having them on the counter top. A unit that sits the pot cover upright and also can accommodate up to two pot covers at same time and two stirring spoons. A unit that will bring organization around the stove, eliminate counter mess, accommodates any pot cover with any knob or handle. Unit is one continuous welded apparatus with the exception of a removable glass bowl.

5 Claims, 4 Drawing Sheets

FRONTAL VIEW

(56) References Cited

U.S. PATENT DOCUMENTS

| | | | |
|---|---|---|---|
| 2003/0173313 A1* | 9/2003 | Morgan | A47J 47/16 211/41.11 |
| 2003/0205645 A1* | 11/2003 | Kaposi | A47G 21/14 248/37.3 |
| 2004/0262459 A1* | 12/2004 | Qualiano | A47J 47/16 248/37.6 |
| 2006/0186124 A1* | 8/2006 | Sergianni | A47J 47/16 220/572 |
| 2007/0199908 A1* | 8/2007 | Kasden et al. | A47J 47/16 211/41.5 |
| 2008/0251472 A1* | 10/2008 | Kasden et al. | A47J 36/06 211/41.2 |
| 2010/0193523 A1* | 8/2010 | Beisheim | A47J 47/16 220/379 |
| 2015/0014495 A1* | 1/2015 | Bausman | A47J 47/16 248/176.2 |

* cited by examiner

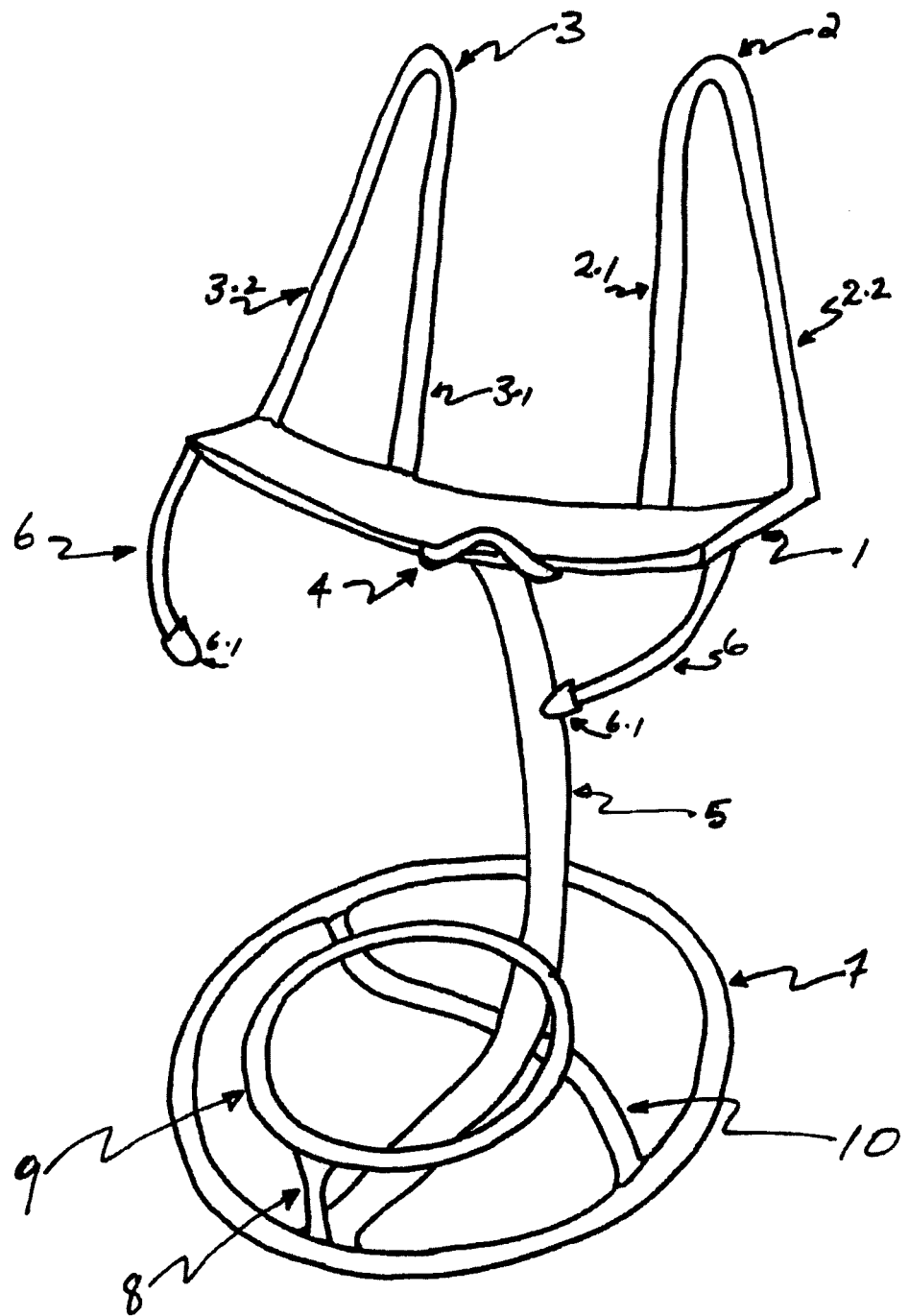
FIG. 1 – FRONTAL VIEW

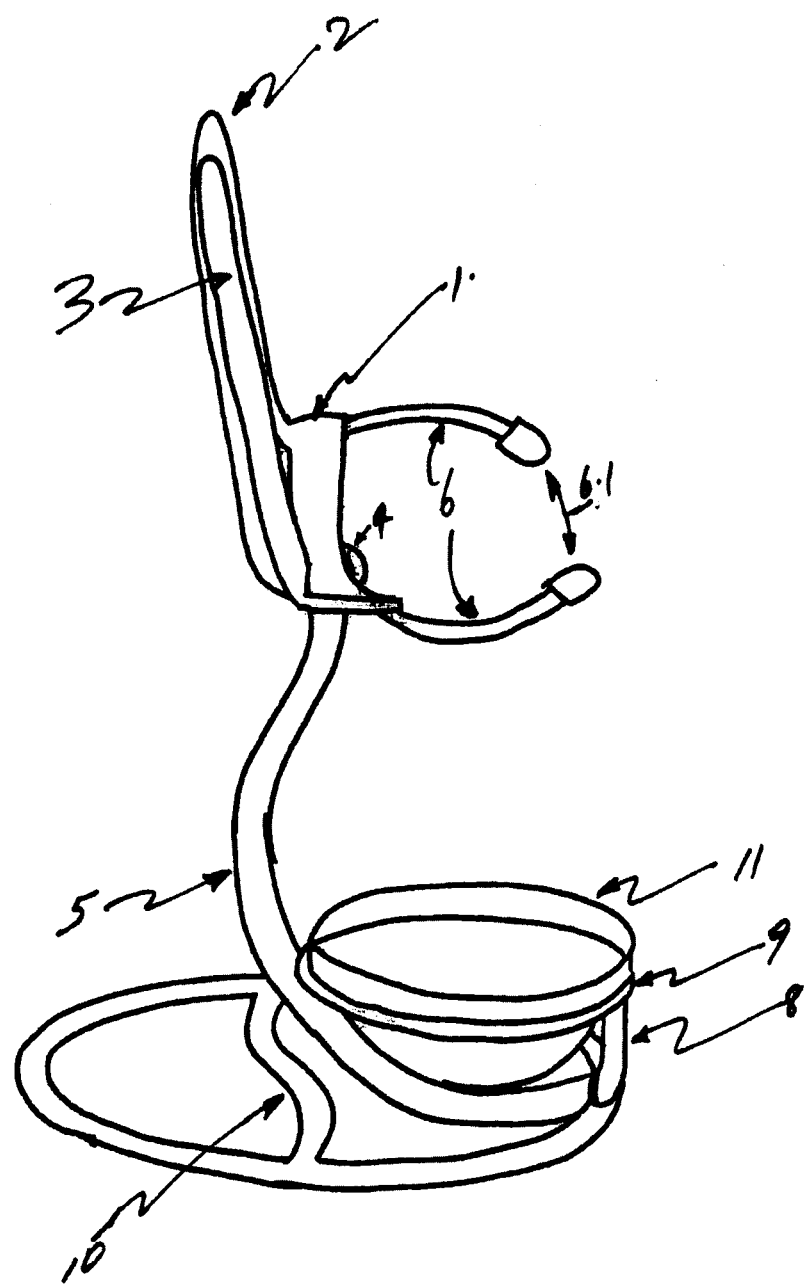
FIG 2-SIDE VIEW

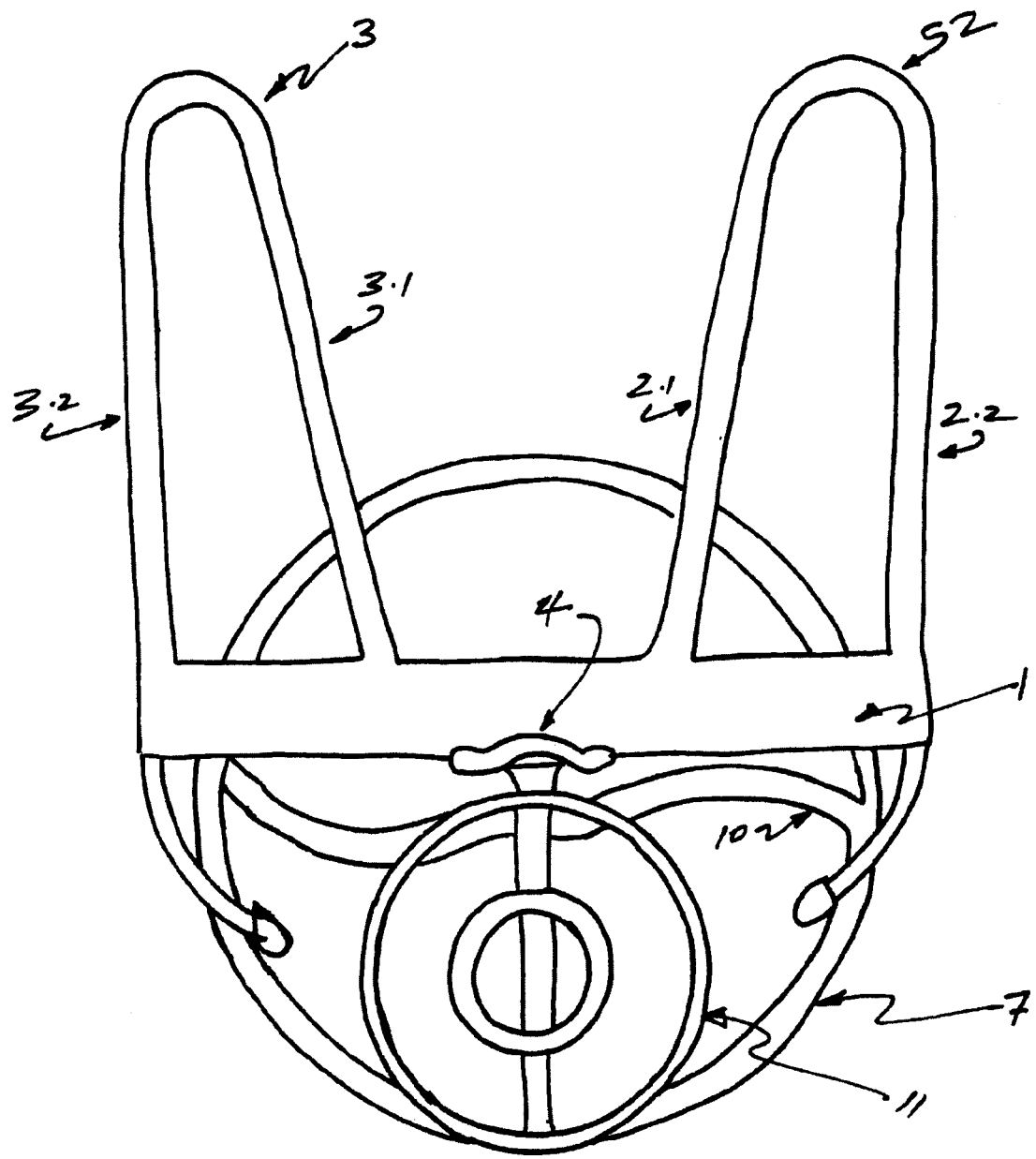
FIG 3 TOP VIEW

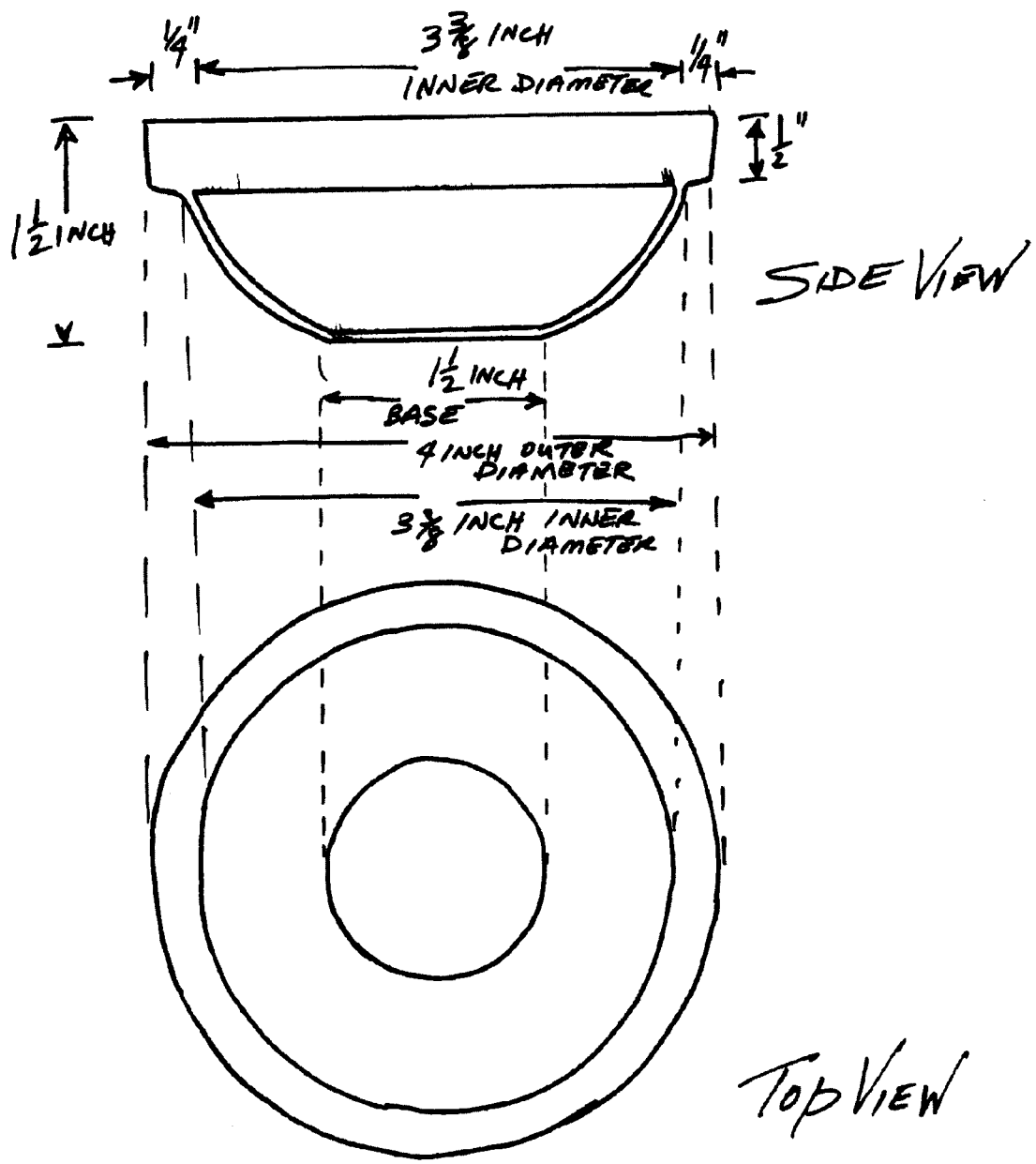
FIG 4 — GLASS BOWL

UNIVERSAL POT COVER HOLDER WITH SPOON REST 2

BACKGROUND OF THE INVENTION

To better understand the background behind the invention, consider this aged-old challenge when you are in the kitchen cooking and you remove your pot cover for whatever reasons, there is a question that must be answered: Where do you place the pot cover? and possible solutions could be any answer to one of these questions that follows:

Do you rest it on your counter top (sometime upside down)?

Do you hold it in one hand while using the other to stir?

Do you sometimes stretch to place it in the sink?

Do you rest it on top of another pot?

Also, what do you do with the spoon after you have stirred your pot?

There is a single solution to all these questions which will lead to the introduction of the universal pot cover holder with spoon rest 2.

It is not a secret that users of the kitchen or cooks everywhere have experienced the difficulties involved in handling a hot and dripping pot cover. The challenge as to where to put the pot cover has always been a problem. The choice is to put the pot cover on the counter top and if placed down, leaves a pool of water or a circle of what is cooking on the counter. Another solution is to place the cover upside down with the knob on the counter, which makes it difficult and can cause burns when ready to place it back on the pot. Another unsafe way is to hold the pot cover in one hand and stir the pot with the other hand and if vigorous stirring is required the use of two hands becomes necessary and is forced to place pot cover on counter top or surface. That action is dangerous which can lead to the pot to move from over the flame. Some cooks cannot be bothered with either option mentioned above and so the pot cover is placed in the sink or on top of another pot on the stove. What makes it even more challenging to the cook is if they are cooking multiple dishes and nowhere to place the second pot cover if they need to add or stir the pot.

Apart from the challenge of where to place the cover, there is also the challenge of where to place the variety of implements like the stirring spoons, forks or the like. Normally all the implements would have placed if not on the counter, in the sink if close by, placed on top of a pot on the stove or placed in another container with water. Problems and difficulties have been encountered when employing these procedures and there is food spillage or drippings on the counter that lead to mess.

Over the years, there are prior art that attempt to solve this aged old challenge that the cook faces in the kitchen and they have lack the sufficient functionality to care of all challenges stated above in one convenient design. The irregular shape of pot covers, their knobs and or handles have proven difficult for prior arts to solve the problem. No wonder there is presently no significant design that have market success. Accordingly, a need remains for a kitchen utensil and pot lid holder in order to overcome the above-noted shortcomings. The present invention satisfies such a need by providing an apparatus that is easy to use, durable in design, effective in use, and practical and functional. Such an apparatus provides the user with a convenient holding place for a hot spoon or lid, which eliminates the mess. The apparatus also eliminates the need to hold a hot lid in one hand while trying to stir the contents of a pot with the other. With such a kitchen utensil and pot lid holder, a counter top remains free of spills and unwanted mess, while also preventing a person from burning their counter top surface or hands. The apparatus is appreciated for its convenience and ease of use by professionals in the culinary industry, as a well as everyday persons.

OBJECT OF THE INVENTION

The object of the present invention to provide a pot cover holder which is universal in its use in that it can accommodate any pot cover of any material, with any knob or handle, any edge contour or configuration, stable support of pot covers, allow drippings from the cover to be collected in a glass bowl without messing counter top, can accommodate two pot covers at same time and can accommodate two stirring implements.

SUMMARY OF THE INVENTION

In view of the foregoing background, it is therefore an object of the present invention to provide a kitchen with a universal pot cover holder with spoon rest 2. Since most kitchen have different cook wares hence different pot covers, this invention takes care of the random placements of covers when not in immediate use. The uniquely spaced arches on the universal pot cover holder with spoon rest 2 takes care of any knob or handle on any pot covers. When pot covers are placed on the present design, the user will not have to worry about the size of cover since the present design takes care of the diameter space that would have normally being used up on the counter as on the present design, pot covers rest upright. Stirring spoons when not in use, can conveniently be placed in the glass bowl that is position below. This glass bowl is removable and dishwasher safe. The drippings or condensate from the hot pot cover will be collected in the glass bowl which is removable.

BRIEF DESCRIPTION OF THE SEVERAL VIEWS OF THE DRAWING

The features of this invention are set forth with particularity in the claims. The invention itself, however, both as to its organization and method of operation, together with further objects and advantages thereof, may best be understood by reference to the following description taken in connection with the accompanying drawings in which:

FIG. 1 is a perspective angular frontal view showing the universal pot cover holder FIG. 2 is a side-elevation view of the apparatus shown in FIG. 1, showing the glass bowl in its position according to the invention FIG. 3 is a perspective top view of the apparatus shown in FIG. 2, showing the glass bowl in its position according to the invention FIG. 4 is a perspective side and top view of the glass bowl.

DETAILED DESCRIPTION OF DRAWINGS

This apparatus has its members welded together with the exception of the removable glass bowl. The best way considered to describe this apparatus is start from base of the apparatus.

The universal pot cover holder with spoon rest consists of a circular base 7 (FIG. 1) connecting by weld to a curve upright member 5. Upright member 5 is connected to curved planar member 1. This curved planar member 1 is the core of this apparatus as this is where the pot cover sits/rest on.

According to FIG. 2, planar member 1 is designed to be slightly tilt to the front which allows drippings from the pot cover to fall into the glass bowl 11. Upright member 5 is welded to member 1 more to the back of curve planar member 1 to create a hangover. This will allow the drippings from the cover to fall into glass bowl 11. There are two arches 2 and 3 that are critically angled backwards connecting by welds to curved planar member 1. Both 2 and 3 have same height from curved planar member 1 and are symmetrical placed. However, the inner legs, members 3.1 and 2.1 are slightly longer than outer legs members 3.2 and 2.2.

Because of the space between the arches, any pot cover with any knob or handle will fit comfortably. Member 4 is welded to member 1 to prevent the pot cover from sliding off planar member 1. Under the ends of planar member 1 are two arm-like members with rubber tips. These members 6 is referred to as the spoon rest. These both bent symmetrical backwards as shown in FIG. 2 and can accommodate two implements like stirring spoons and at the ends thereof are two rubber ends 6.1. As part of the spoon rest of this entire apparatus, there is member 9 (welded to member 5) that allows glass bowl 11 to be cradled see FIG. 2. This glass bowl 11 which is removable (see FIG. 1) serves two purposes:

1. To collect the drippings from the pot covers
2. To accommodate the spoon(s).

Member 8 serves as a vertical support for bowl cradle 9.

Glass bowl have flat base with diameter smaller than diameter bowl edge. Bowl edge is parapet to rest on member 9

PATENT REFERENCE CITED

| | | |
|---|---|---|
| 6,672,550 | January 2004 | Borodulin |
| D530,570 | October 2006 | Krueger |
| 6,672,550 | January 2004 | Borodulin |
| D476,847 | July 2003 | Kingsley |
| 6,585,200 | July 2003 | Borodulin |
| D401,496 | November 1998 | Lambert |
| D398,483 | September 1998 | Stocco |
| D369,052 | April 1996 | Mele |
| D362,778 | October 1995 | Mele |
| 5,297,766 | March 1994 | Hoffman |
| 5,246,195 | September 1993 | Huff |
| D265,622 | August 1982 | Bartels |
| 5,038,945 | August 1991 | Melkonian |

PATENT REFERENCE CITED

| | | |
|---|---|---|
| 5,127,616 | July 1992 | Carney |
| 4,911,310 | March 1990 | Raishe |

I claim:

1. A universal pot cover holder for supporting a pot cover, the pot cover holder consisting of:
   a circular base for supporting the pot cover holder on a support surface;
   a curved upright member extending up from said circular base;
   a planar rectangular member, attached to a top of said curved upright member, said planar rectangular member having a first long side and a second long side;
   a stop member attached to a center of the first long side configured to hold the pot on the planar rectangular member;
   a first u-shaped elongate member attached to an end of said second long side, the second long side is opposite the first long side;
   a second u-shaped elongate member attached to an opposite end of said second long side spaced from said first u-shaped member; wherein said stop member extends between the first u-shaped elongate member and the second u-shaped elongate member;
   a plurality of spoon rests extending opposite ends of the first long side for supporting a utensil, each spoon rest having a rubber end portion;
   a cradle member extending from said base portion to support a glass bowl used to catch drippings from the pot cover that is supported on the planar rectangular member.

2. A universal pot cover of claim 1, wherein said planar rectangular member is curved downwardly to support the pot cover thereon.

3. A universal pot cover holder of claim 1, wherein said planar rectangular member is located on a top of the curved upright member and includes a hangover above a glass bowl.

4. A universal pot cover holder of claim 1, wherein said planar member is tilted so the first long side is lower than the second long side.

5. A universal pot cover holder of claim 1, wherein said u-shape elongated members slightly tilt backwards.

\* \* \* \* \*